(12) United States Patent
Mufti et al.

(10) Patent No.: US 7,027,804 B2
(45) Date of Patent: Apr. 11, 2006

(54) COMMUNICATIONS TERMINAL

(75) Inventors: Moyeen Shujauddin Mufti, Staines (GB); Tae-Hyun Nam, Kingston upon Thames (GB)

(73) Assignee: Samsung Electronics Co., Ltd., (KR)

( * ) Notice: Subject to any disclaimer, the term of this patent is extended or adjusted under 35 U.S.C. 154(b) by 582 days.

(21) Appl. No.: 10/354,622

(22) Filed: Jan. 30, 2003

(65) Prior Publication Data

US 2003/0143986 A1    Jul. 31, 2003

(30) Foreign Application Priority Data

Jan. 31, 2002    (GB) .................................... 0202257

(51) Int. Cl.
*H04M 3/42*    (2006.01)

(52) U.S. Cl. .................... 455/417; 379/388.02; 381/91

(58) Field of Classification Search ..................... None
See application file for complete search history.

(56) References Cited

U.S. PATENT DOCUMENTS

| 5,673,304 | A | * | 9/1997 | Connor et al. ................. 379/45 |
| 5,838,804 | A | * | 11/1998 | Holthaus et al. ............. 381/111 |
| 6,266,424 | B1 | * | 7/2001 | Papadopoulos et al. ..... 381/113 |

FOREIGN PATENT DOCUMENTS

EP    0 843 301 A2    5/1998

OTHER PUBLICATIONS (GSM 06.82 version 8.0.1 Released 1999) "Voice Activity Detection for Enhanced Full Rate Speech Channels" ETSI EN 300 730 V8.0.1 (Nov. 2000).

"Mobiles Blamed for More Accidental 999 Calls", The Guardian, Jul. 30, 2001.

* cited by examiner

*Primary Examiner*—Fan Tsang
*Assistant Examiner*—Matthew Genack
(74) *Attorney, Agent, or Firm*—Dilworth & Barrese LLP

(57) ABSTRACT

A communications terminal comprising means operable, in the absence of significant input to the terminal, to automatically terminate a call.

10 Claims, 12 Drawing Sheets

COMMUNICATIONS TERMINAL

PRIORITY

This application claims priority to an application entitled "Communications Terminal" filed in the United Kingdom Patent Office on Jan. 31, 2002 and assigned Serial No. GB0202257.2, the contents of which are incorporated herein by reference.

BACKGROUND TO THE INVENTION

1. Field of the Invention

This invention relates to communications terminals, and in one particularly preferred embodiment to mobile communications terminals, such as a mobile telephone for example.

2. Summary of the Related Art

One previously proposed communications terminal, in this case a mobile telephone, is illustrated schematically in FIG. 1 of the accompanying drawings.

As shown, the terminal 1 comprises a display 3, an aerial 5 and a plurality of keys 9 arranged in a keypad. The keys, as is known in the art, can be arranged as so-called hard keys with one predetermined function or alternatively they can be arranged as soft-keys which have a plurality of functions depending on the particular operating mode of the terminal. The terminal 1 is provided with a microphone 11 and a loudspeaker 13 for input of user speech and generation of audio signals for relaying to a user. An infra-red input/output port 12 is also provided to permit infrared optical data signals to be received from and/or transmitted to other mobile terminals which are also equipped with an appropriate port.

FIG. 2 is a schematic representation of key components of the terminal shown in FIG. 1. As shown, the terminal 1 includes a central control unit or processor 15 that, at least in general terms, is operable to control operation of the terminal. Coupled to the processor 15 is a radio unit 17 and timing control circuitry 19 that together are operable to control the transmission and reception of telecommunications signals to and from other telecommunications terminals or from telecommunications networks to which the terminal can connect via the aerial 5.

A removable data storage device or subscriber identity module (SIM) is provided for data and program storage. The data will usually comprise the IMSI (International Mobile Subscriber Identity) (which uniquely identifies the telephone), and other information such as a set of telephone numbers stored on the phone by the user. Software programs may also be stored on the SIM as part of the so-called SIM toolkit (or SIM application toolkit as it is otherwise known).

Coupled to the processor 15 is the display 3, and signals can be sent from the processor 15 to the display in order to convey messages, instructions, and other information to a user of the terminal. The processor is also coupled to the keypad 9 for data input by a user to the terminal.

Sound (for example user speech) picked up by the microphone 11 is processed by a speech processor 21 (for example to remove non-transmittable frequencies), and a coder/decoder (CODEC) 23 that is operable to convert analog signals generated by the microphone 11 into digital data for subsequent processing. The speech processor 21 and CODEC 23 are also operable to process received digital data and convert it into appropriate audio signals for relaying to a user by means of the loudspeaker 13.

Also coupled to the processor 15 is a ring generator 25 which is operable to generate one of a variety of different alerts which are used to alert a user of the terminal as to when a call, a message or other information is received at the terminal 1. In this particular case the ring generator is operable to generate appropriate signals to drive a vibrating buzzer 27, to illuminate an LED 28 (or bank of illumination devices) or to generate a ring signal for relay to the user via the loudspeaker 13. Typically, a user of the terminal is able to select which of these alert options are most preferable for their current ambient environment. For example, a user who is at work and does not want to disturb his or her colleagues with an audible ring tone might choose the vibrating buzzer as an alternative means to alert them to an arriving call at the terminal.

It is a recognised problem with communications terminals in general, and mobile telephones in particular, that it is relatively easy to accidentally place a telephone call to another party (a called party).

To combat this problem, most modern mobile telephones are provided with a "key lock" facility to temporarily disable the keypad of a mobile telephone (and hence prevent the user from placing a call until the keypad has been unlocked). However, it has recently been reported in an article published in The Guardian on Monday, 30 Jul. 2001, that despite the provision of such a facility, an estimated 24% of calls received by the emergency services in the United Kingdom (some 2,000 calls a day) were made from mobile telephones where no emergency service had been requested. These so-called "silent calls" were found, in the main, to have been made by mobile telephone owners who had made the call by accidentally pressing a key on their telephone.

Clearly, these previously proposed key pad locks are not providing a practical solution to the problem of accidental calls, and as a result these calls are still a significant nuisance to the emergency services and to users who are, of course, being charged for making the calls.

This problem of accidental calls is also not limited to the field of mobile telephony. For example, similar problems have been reported with landline telephone transceiver equipment (such as, for example, telephone equipment for direct connection to the PSTN) where the so-called "speed dial" facilities of modem wired telephone transceiver equipment have made it relatively easy (when cleaning the telephone equipment for example) to accidentally knock the receiver off-hook and inadvertently press a speed dial button. If this happens the telephone equipment automatically dials the stored number associated with the pressed button, and if the call is answered by the called party then a communications channel will be established between the calling party and the called party.

In the case of landline equipment, the problem can be exacerbated yet further by the particular design of PSTNs and associated telephony equipment which tends to keep communications channels open until the calling party replaces their receiver on-hook (hangs-up). This means that a called party who has received a silent call and has hung-up, can end up being reconnected to the silent call when they next pick up their receiver if the calling party has not hung-up in the meantime. When this happens it is often the case that the only way to terminate the communications channel is for the called party to contact the calling party by some other means (if indeed this is possible) and alert them to the fact that they have inadvertently placed a call.

A further problem that the present invention seeks to address is concerned with the situation where a calling party thinks that they have terminated a call (for example by pressing an end transmission button or by attempting to hang-up the receiver) but have in fact not actually terminated the call. In such circumstances the calling party could well find that the communications channel set up with the called party is kept open, and hence that they are still being charged for the call even though they think that the call has been terminated.

This problem is of particular significance in the field of mobile voice telephony given the relatively high cost of calls. It would also be a problem if a data call is initiated from a mobile terminal—for example, to a WAP (Wireless Application Protocol) gateway for access to the internet. In such a situation the WAP gateway would not take steps to terminate the call and thus a user who thought they had terminated the internet call but in fact had failed to do so would continue to be charged for the call until they realised that the channel was still open, and took steps to terminate it correctly.

In the field of landline telephony (for example via telephone equipment connected to a PSTN), this problem would be quite significant since the communications channel (as explained above) will tend to be kept open until the calling party hangs-up. Thus, a user who has placed a call and thinks that they have hung-up (but in fact have not correctly placed the receiver on-hook) would continue to be charged for the call until they realised that the channel was still open and took steps to hang-up properly.

It is an aim of the present invention to address, and preferably alleviate, the problems described above.

SUMMARY OF THE INVENTION

In pursuit of this aim, one embodiment of the present invention provides a communications terminal comprising means operable, in the absence of significant input to the terminal, to automatically terminate a call.

This embodiment of the invention enables the terminal to automatically terminate a call in the absence of significant input (such as for example: audio input above a threshold; "noise and voice" input as opposed to "noise without voice" input; detected human speech; or data).

Preferably, the terminal comprises means for detecting input to the terminal, said terminating means being operable to automatically terminate said call in the absence of detected significant input to the terminal.

Preferably the detecting means is operable to detect audio input and/or data input to said terminal.

In one embodiment the detecting means is operable to distinguish between noise and user speech, and noise without user speech; and could comprise a voice activity detector.

In another embodiment the detecting means is operable to detect human speech.

In another embodiment the detecting means comprises means for converting audio signals into a DC voltage, and a comparator for comparing said DC voltage signals with a predetermined threshold signal, an absence of significant input being determined if said DC voltage signals should drop below said threshold voltage signal (which might be adjustable).

In preferred embodiments of the invention, the terminating means determines that an absence of input has occurred if significant input has not been detected by said detecting means for a predetermined time period (which is preferably adjustable).

Preferably, the terminating means is operable, upon a determination of an absence of significant input, to control the terminal to emit an alert to attempt to notify a user of the existence of said call.

Preferably, the alert is generated for a predetermined time period, and said terminating means is operable to automatically terminate said call if no (significant) input to said terminal has occurred whilst said alert is emitted.

Preferably, the terminating means and/or said detecting means comprises software.

Another embodiment of the invention relates to a method comprising the steps of: detecting input to a telecommunications terminal during a telecommunications call; and automatically terminating said call in the event of a detected absence of (significant) input.

Yet another embodiment of the invention relates to a computer program comprising one or more computer program portions operable, when executed in an execution environment, to perform one or more of the steps of the method described herein.

Yet another embodiment of the invention relates to a communications terminal comprising means operable to establish a communications channel between said communications terminal and a second communications terminal, means for detecting input to said (first mentioned) communications terminal, and means operable in the absence of significant detected input to automatically terminate the communications channel established with said second communications terminal.

These embodiments of the invention permit a terminal to automatically terminate a call if no input to the terminal has been detected. By virtue of this arrangement it is thus possible to automatically terminate accidental calls (thereby reducing charges for calling parties, and inconvenience for called parties), and to ensure that a communications channel is automatically terminated in the event that a calling party has attempted unsuccessfully to hang-up a call.

Preferred features and aspects of these embodiments are set out in the following description, and in the accompanying dependent claims.

BRIEF DESCRIPTION OF THE DRAWINGS

Preferred embodiments of the invention will now be described in detail, by way of illustrative example only, with reference to the accompanying drawings, in which.

DETAILED DESCRIPTION OF PREFERRED EMBODIMENTS

Figure 1:
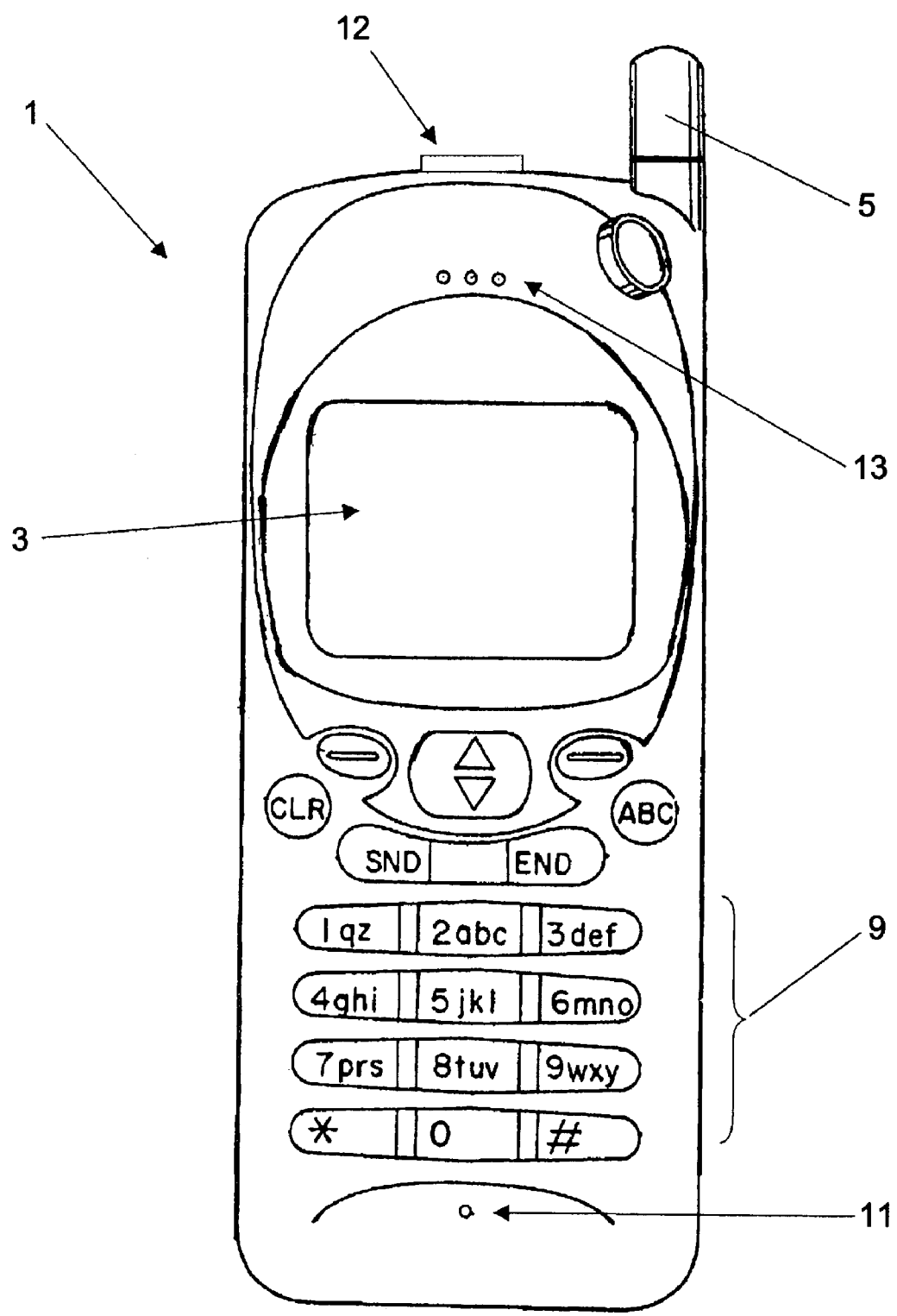
FIG. 1 is a schematic representation of a previously proposed communications terminal, in this case a mobile telephone.

Various embodiments of the invention will now be described in detail with reference to a mobile telephone of the kind shown in FIG. 1 of the accompanying drawings, and with particular reference to a GSM mobile telephone. However, it will be appreciated—and should be noted—that the teachings of the present invention are equally applicable to any communications terminal (such as a mobile telephone, a landline telephone (i.e. for direct wired connection to the PSTN), a portable digital assistant (PDA) with telephonic capabilities, or any other sort of telephonic transceiver equipment). As a consequence, the following description should not be read as limiting the scope of the present invention in any way.

As mentioned above, FIG. 3 is a schematic representation of the components of a communications terminal in accordance with a first embodiment of the invention.

Figure 2:
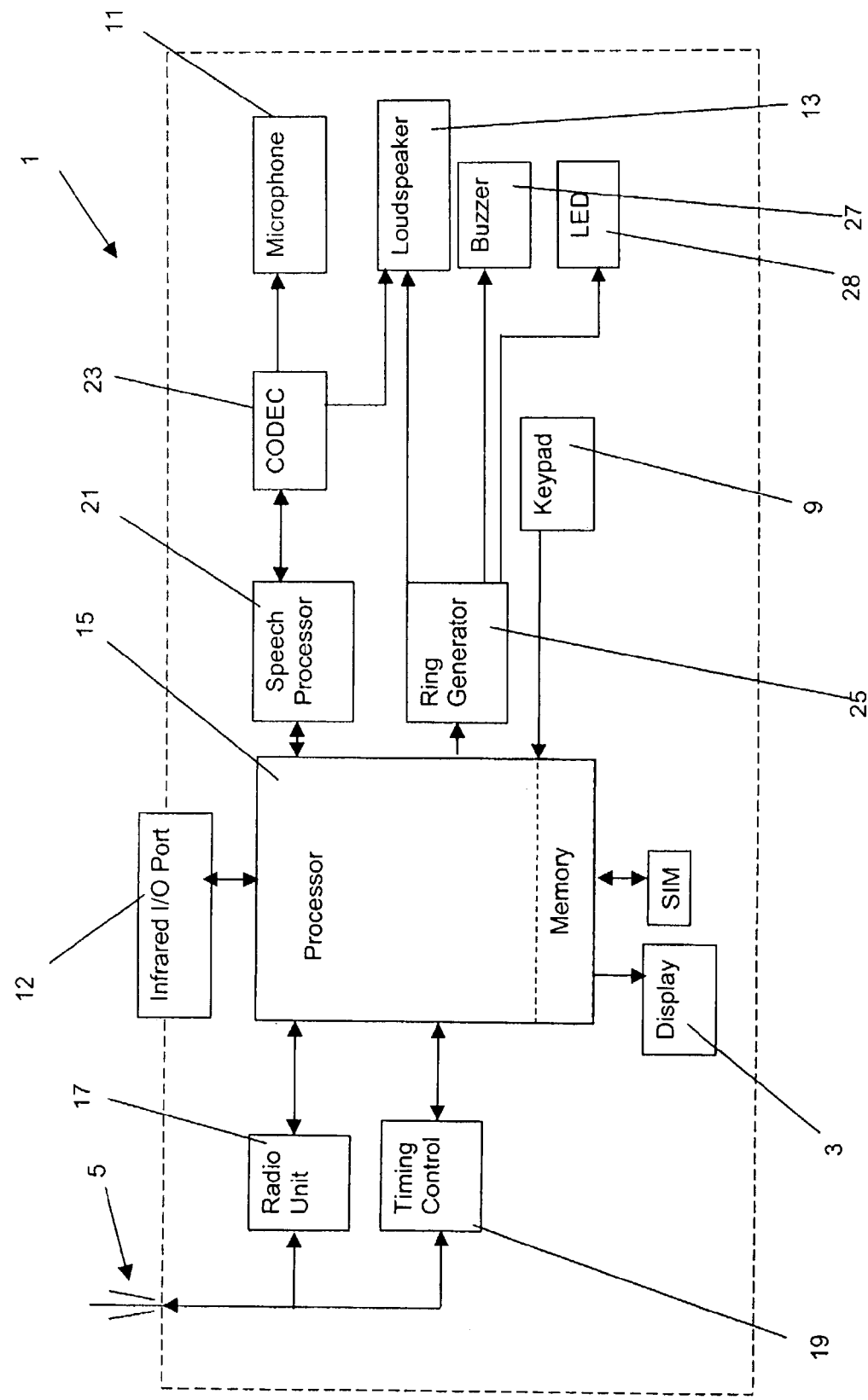
FIG. 2 is a schematic representation of components of the terminal of FIG. 1.
Figure 3:
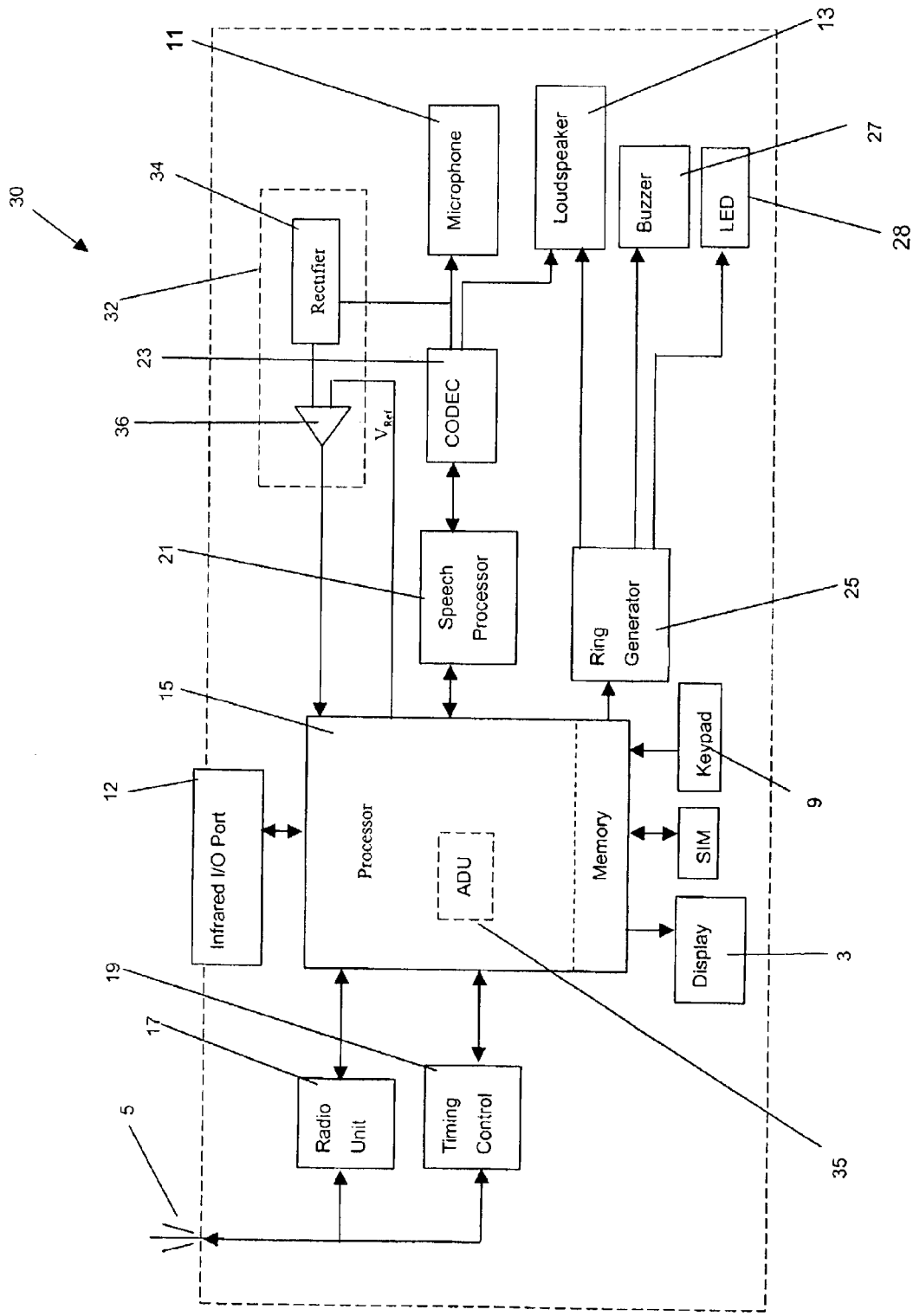
FIG. 3 is a schematic representation of components of a communications terminal, in this case a mobile telephone, in accordance with a first embodiment of the invention.

In the particular example shown in FIG. 3, the communications terminal is embodied as a mobile telephone such as a GSM or UMTS (Universal Mobile Telecommunications System) compatible telephone. The majority of the components of the telephone 30 are the same as those illustrated in FIG. 2, and these components will be referenced with the same numerals as those used above in connection with the description of FIG. 2.

As shown, the phone 30 comprises a display 3, an aerial 5 and a plurality of keys 9 arranged in a keypad, a microphone 11 and a loudspeaker 13 for input of user speech and generation of audio signals for relaying to a user. An infra-red input/output port 12 is provided to permit the reception and/or transmission of infrared optical data signals.

The terminal 30 includes a central control unit or processor 15, and coupled to the processor 15 is a radio unit 17 and timing control circuitry 19 that are operable to control the transmission and reception of telecommunications signals. The display 3 is also coupled to the processor 15, and signals can be sent from the processor 15 to the display in order to convey messages, instructions, and other information to a user of the terminal.

The processor is also coupled to the keypad 9 (for data input by a user to the terminal), and to a ring generator 25 which is operable to generate one of a variety of different alerts which are used to alert a user of the terminal as to when a call, a message or other information is received at the terminal. In this particular case the ring generator is operable to generate appropriate signals to drive a vibrating buzzer 27, an LED or equivalent illumination device 28 or to generate a ring signal for relay to the user via the loudspeaker 13.

A microphone 11 is provided, and is operable to convert sound signals (such as user speech for example) from the phone's ambient environment into analog AC electrical signals that are subsequently passed to a speech processor 21 for processing, and a coder/decoder (CODEC) 23 that is operable to convert the analog signals generated by the microphone 11 into digital data for subsequent processing. The speech processor 21 and CODEC 23 are also operable to process received digital data and convert it into appropriate analog audio signals for relaying to a user by means of the loudspeaker 13.

Coupled between the CODEC 23 and the microphone 11 is level sensing logic 32 which is operable, in the preferred embodiment, to continuously monitor the AC analog electrical signal output by the microphone 11 during a call as it picks up sound from its surrounding environment.

The level sensing logic 32 comprises a rectifier 34 which is operable to convert AC analog audio signals from the microphone 11 into a DC voltage signal that rises and falls with the amplitude of the AC audio signal, and hence with the volume of the audio signals detected by the microphone.

The output of the rectifier 34 is connected to an input of a comparator 36 that is operable to compare the DC voltage signal output by the rectifier with a reference voltage $V_{Ref}$ supplied at another input of the comparator 36.

If the voltage level output by the rectifier 34 is less than the voltage level of the reference voltage $V_{Ref}$, a low volume alert signal is sent by the comparator 36 to the processor 15 to indicate that the volume of the audio signal received by the microphone 11 has fallen below the volume level represented by the predetermined reference voltage $V_{Ref}$.

The processor 15 comprises an automatic disconnect unit (ADU) 35. In the preferred embodiment, the ADU is implemented by software executed by the processor 15. It will be appreciated, however, that the functionality of the ADU could of course be provided by hardware (such as one or more application specific integrated circuits (ASICs) for example) wired to the processor 15. The ADU, in software form, could form part of a so-called SIM Toolkit (or SIM Application toolkit as it is sometimes known) or part of the software provided in the mobile terminal.

The ADU 35, on receipt of a low volume alert signal from the comparator 36, starts an internal timer and continues to monitor the output from the comparator 36. If the level of the DC signal from the rectifier 34 does not exceed the reference voltage $V_{Ref}$ before the timer expires, the ADU 35 determines that the user may have tried to terminate the call and alerts the user to the fact that the communications channel is still open. The ADU 35 then starts another timer and activates an alert mechanism (such as a buzzer for example) to indicate to the user that they should respond. If there is no response the ADU then takes steps to automatically terminate the call by, for example, controlling the protocol stack to generate a RIL3-CC DISCONNECT message that automatically disconnects the terminal.

If the level of the DC signal from the rectifier 34 rises to exceed the reference voltage $V_{Ref}$ before either of the timers expire, the ADU 35 determines that there has been a temporary pause in audio input, takes no action to terminate the call and resets the timer or timers, as appropriate.

Figure 4:
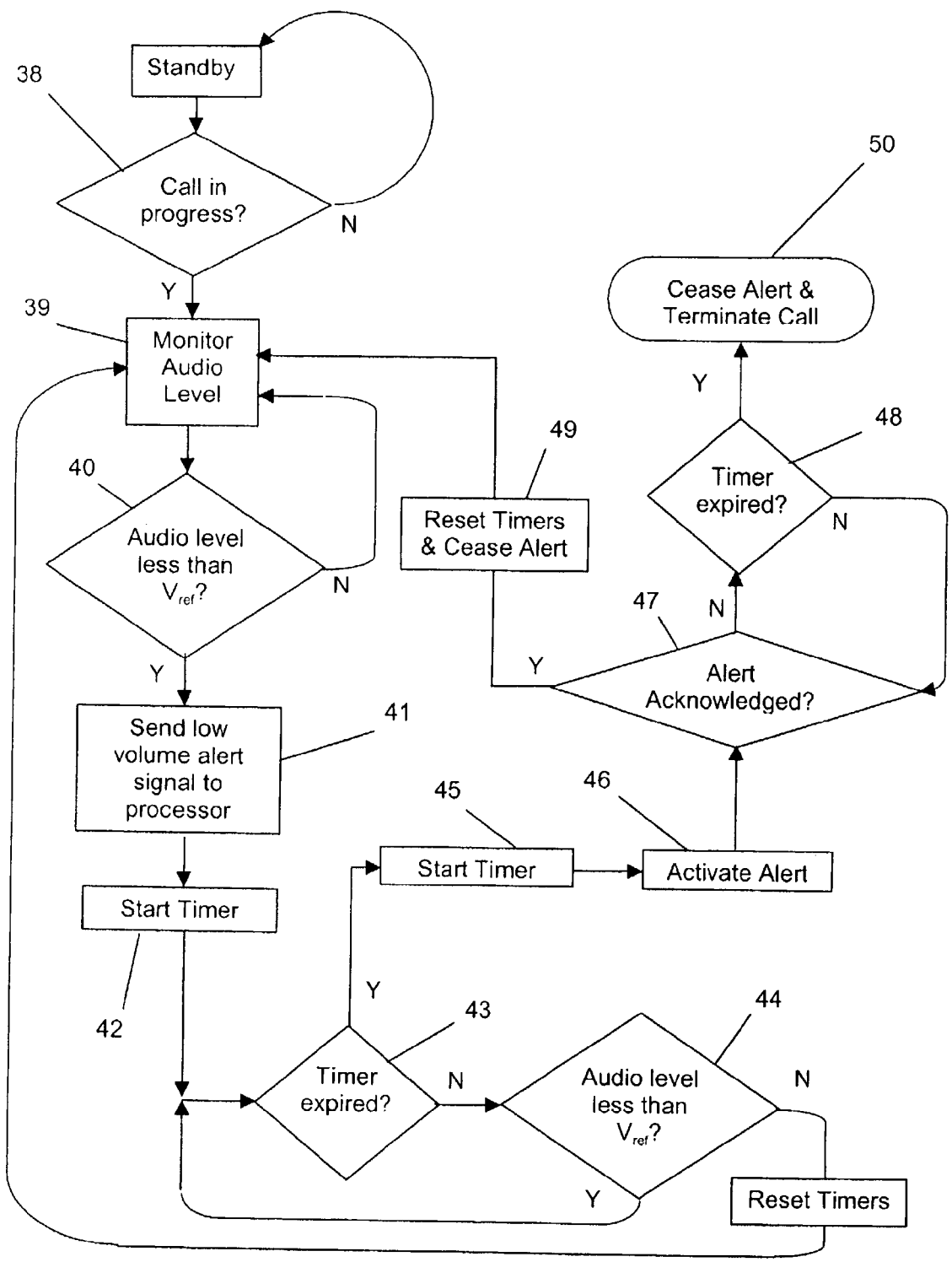
FIG. 4 is a flow chart illustrating schematically the steps of an illustrative automatic call termination procedure.

FIG. 4 is a flow chart illustrating schematically the steps described above. As shown, when the terminal detects in step 38 that a call is in progress power is supplied to the microphone and level sensing logic 32, and the AC analog signal generated by the microphone 11 is sampled in step 39 by passing the AC signal through the rectifier 34 and on to the comparator 36 where the DC level of the audio signal is compared, in step 40, with the reference voltage $V_{Ref}$.

If the level of the DC audio signal is determined, on comparison with the reference voltage in step 40, to be less than the reference voltage a low volume alert signal is sent in step 41 to the ADU 35.

On receipt of a low volume alert signal, the ADU 35 starts a timer in step 42 and subsequently checks in step 43 whether the timer has expired. If the timer is determined to have expired, the ADU determines that no audio input has occurred for a significant amount of time (which could indicate that the user has accidentally initiated a call, or improperly terminated a call) and starts another timer in step 45. The ADU 35 then controls the processor 15—in step 46—to send a signal to the ring generator 25, and the ring generator generates an alert which is replayed to the user by means of one of the alert devices (such as the loudspeaker, LED, buzzer, or vibrator).

If the timer has not expired the ADU continues to compare the audio level to the reference voltage until the timer is determined to have expired in step 43. If the audio level should rise above the reference voltage at any point, then the call is determined to still be active and processing is returned to step 39 above.

If the timer is determined to have expired in step 39, the ADU then checks, in step 47, if the alert started in step 46 has been acknowledged by the user. Acknowledgement may be accomplished, for example, by the user pressing a key on the terminal, or speaking into the microphone. If the alert is acknowledged, the ADU (step 49) resets the timers set in steps 42 and 45 and terminates the alert set in step 46 before returning processing to step 39 described above.

If the alert is not acknowledged, the ADU 35 checks in step 48 to see if the timer set in step 45 has expired. If the timer has expired the ADU determines that the call has been placed accidentally or not properly terminated, and stops (in step 50) the alert set in step 46 before automatically terminating the call. If the timer has not expired, then the ADU continues to prompt the user with the alert and look for an acknowledgement.

It can be seen from the above, that this embodiment of the invention provides an effective means of automatically terminating calls in the event that audio signals input at the microphone fall below a predetermined threshold for a predetermined period of time. This can occur, for example, when the user accidentally places a call or when the user has not properly terminated a call.

Whilst this embodiment is effective for voice calls, it will be apparent to persons skilled in the art that problems may arise if the level sensing logic is activated when the terminal is being used to make a fax or data call to a third party. If the level sensing logic were to be activated in such circumstances, then the processor would tend to automatically terminate the call within a short time (governed by the length of the aforementioned internal timers) of it being placed by the user, and probably before the fax or data call had been completed.

To avoid such problems the level sensing logic could be adapted to include a switch (not shown) that is operable—under control of the processor—to disable the level sensing logic if the processor determines that a call is a non-voice call.

As another option, the processor could instead be instructed to vary the reference voltage $V_{Ref}$ supplied to the comparator in dependence on the type of call. For example, in circumstances where the processor detects that the call placed is a non-voice call, then the reference Voltage may be set to zero so that the DC voltage signal input to the comparator never falls below the reference voltage $V_{Ref}$.

An advantage of providing a reference voltage which is settable to different values under control of the processor is that the user might then be able to specify different reference voltage settings for different environments.

For example, it is commonplace for modern mobile telephones to be provided with a variety of different "modes" which can be selected by the user to change features of the phone such as the ring tone and/or the volume of the ring tone. In a "meeting mode", for example, the ring tone might be set to a single relatively quiet bleep, and in an "outdoors" mode for example the ring tone might be a series of relatively high volume, high pitched rings.

The automatic disconnect function described above could be implemented as a user selectable option for the aforementioned modes. For example, the user could choose to adapt a "meeting mode" to include a relatively low volume threshold for automatic disconnection on the basis that there is likely to be little background noise in a meeting and thus little danger of the background noise being sufficiently loud to cause the level sensing logic to determine that audio input at the microphone is occurring. For the aforementioned "outdoor mode" the user could choose to set the volume threshold to be relatively high so that the background noise that one tends to encounter when outside in a city, for example, is not loud enough for the level sensing logic to determine that audio input at the microphone is occurring.

It will also be apparent to persons skilled in the art, that the processor could be arranged—at an early point in the initiation of a call (or indeed at regular intervals throughout a call)—to sample the ambient noise levels (as detected by the microphone) and set the reference voltage $V_{Ref}$ to a value that is appropriate for the audio volume levels in the terminal's ambient environment (for example to a value slightly above the DC voltage level corresponding to the volume of the ambient environment). Such an arrangement would make it less likely for the processor to determine that ambient noise is audio input to the terminal.

As mentioned above, one option to prevent the processor from inadvertently terminating a non-voice call (due to a lack of audio input) would be to include a switch that is operable to disable the level sensing logic when the processor determines that a call is a non-voice call.

However, one disadvantage with such a proposal is that the automatic disconnection facility would then not be available to non-voice calls, and the danger would then be that a user could accidentally initiate a non-voice call (such as a call to a WAP gateway for internet browsing) for which they would then be charged.

Figure 5A:
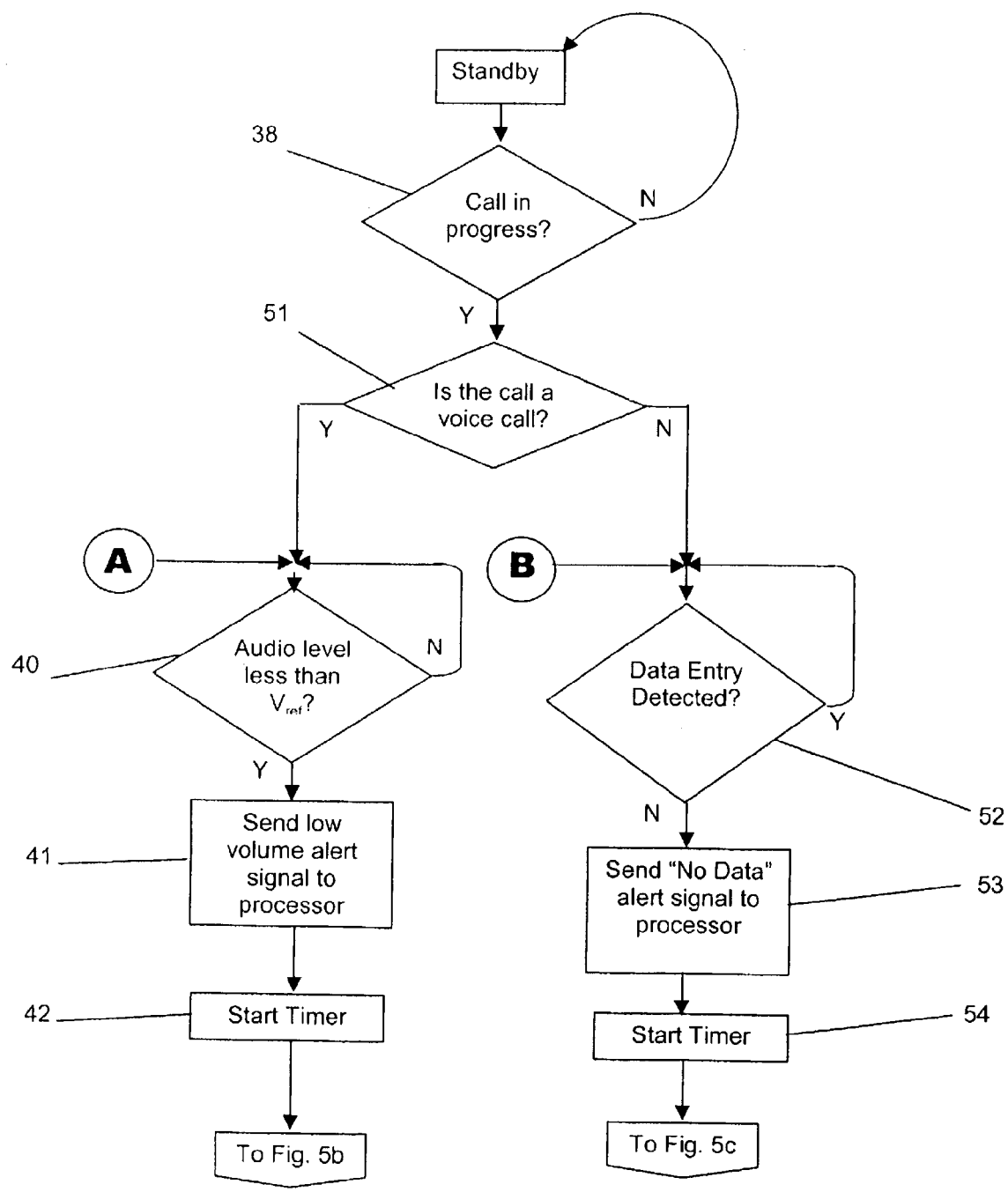
FIGS. 5a, 5b and 5c are flow charts illustrating a modification of the procedure of FIG. 4.
Figure 5B:
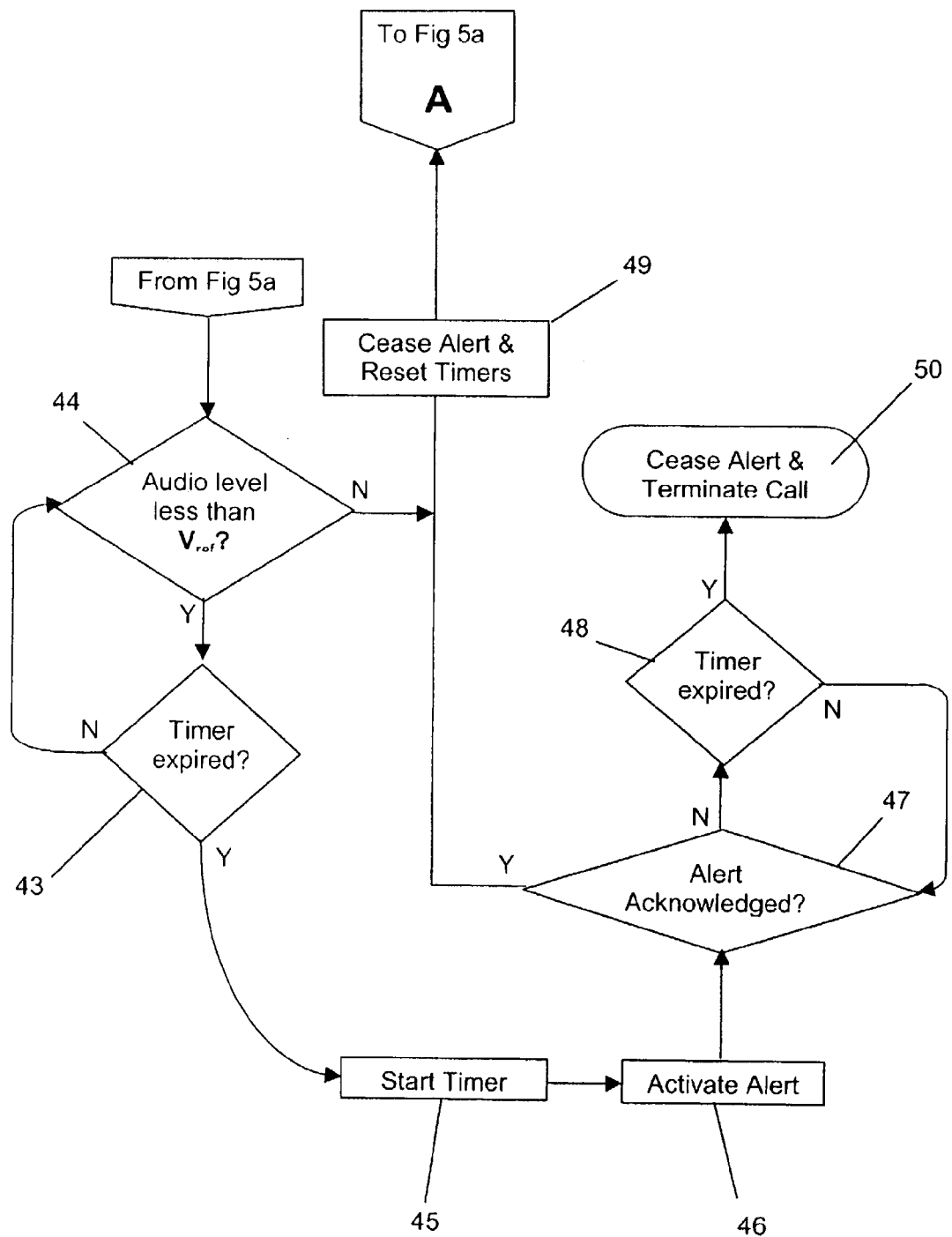
Figure 5C:
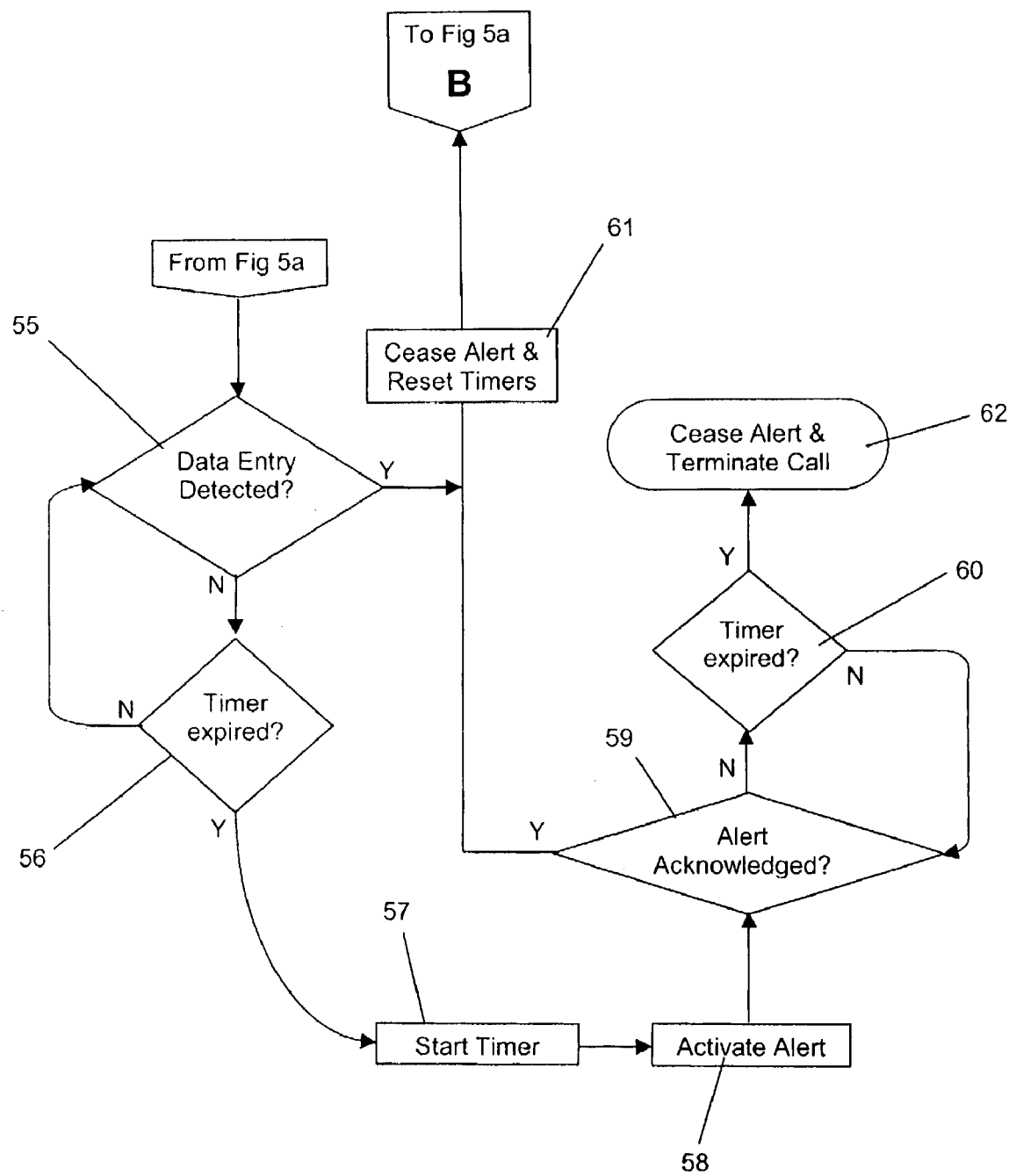

FIGS. 5*a* to 5*c* illustrates a modification of the process shown schematically in FIG. 4. The process illustrated in FIGS. 5*a* to 5*c* makes use of the fact that non-voice calls, whilst not involving audio input, will nevertheless involve data input or output of some kind that is detectable, and usually orchestrated by the processor.

For example, if the user is making a call to a WAP gateway then the user will have to navigate through the web pages of the sites they visit by, for example, activating certain navigation keys on the keypad. Similarly, if the mobile terminal is being used as a fax machine, for example, to transmit data from a laptop computer, then a data cable will be coupled to the terminal and data will flow from the laptop to the terminal for transmission. Data input to the terminal by means of the keypad or a data cable, or via the aerial and radio unit or by any other means, is detectable by the processor and hence can be used to indicate user activity.

Steps of the method shown schematically in FIGS. 5*a* to 5*c* that are common to the method shown in FIG. 4 are referenced with the same reference numerals as those used in FIG. 4. The "extra" functionality of the process shown in FIGS. 5*a* to 5*c* (over that of the process shown in FIG. 4) may be implemented in hardware (such as an Application Specific Integrated Circuit wired between data input points of the terminal and the processor). However, it is considered that the extra functionality of FIGS. 5*a* to 5*c* would most probably be implemented as software, and as such could form part of a so-called SIM Toolkit (or SIM Application toolkit as it is sometimes known) or part of the software provided in the mobile terminal.

The first additional step, step 51, of the process (shown in FIG. 5a) is a call type determination step where the processor determines whether a call is a voice call or a non-voice call, such as a fax or data call for example. This determination may be accomplished simply as a result of the particular key or menu option pressed or selected by the user to initiate the call, or alternatively in response to the data flow through the terminal.

If the call is determined to be a voice call, then the method proceeds as described with reference to the process shown schematically in FIG. 4.

If, on the other hand, the call is determined to be a non-voice call the next step, step 52, in the process is to determine whether data input is taking place. This determination may be accomplished, for example, by detecting key presses on the keypad 9, by detecting data input to an input/output port (IO port—not shown) of the terminal or by detecting data input to the terminal via the aerial 5 and radio unit 17.

If it is determined that no data input is taking place, a "no data" alert signal is sent in step 53 to the ADU 35.

On receipt of a "no data" signal, the ADU 35 starts a timer in step 54 and subsequently checks again in step 55 (FIG. 5c) to see whether data entry has occurred. If data entry has occurred, then the timer is reset in step 61 and processing returns to step 52 (FIG. 5a).

If no data entry is detected, the ADU 35 then checks (in step 56) whether the timer set in step 54 has expired. If the timer is determined to have expired, the ADU determines that no data input has occurred for a significant amount of time (which could indicate that the user has accidentally initiated a call or improperly terminated a call) and starts another timer in step 57. The ADU 35 then controls the processor 15—in step 58—to send a signal to the ring generator 25, and the ring generator generates an alert which is replayed to the user by means of one of the alert devices (such as the loudspeaker, LED or buzzer). If the timer has not expired the ADU continues to look for data entry until the timer set in step 54 is determined to have expired. If data entry should occur at any point the call is determined to still be active and processing is returned to step 52 as described above.

If the timer is determined to have expired in step 56, the ADU then checks, in step 59, if the alert started in step 58 has been acknowledged by the user. Acknowledgement may be accomplished, for example, by the user pressing a key on the terminal, or sending data to the terminal. If the alert is acknowledged, the ADU resets the timers set in steps 54 and 57 and terminates the alert set in step 58 before returning processing to step 52 described above.

If the alert is not acknowledged, the ADU 35 checks in step 60 to see if the timer set in step 57 has expired. If the timer has expired the ADU determines that the call has been placed accidentally or not properly terminated, and stops (in step 62) the alert set in step 58 before automatically terminating the call. If the timer has not expired, then the ADU continues to prompt the user with the alert and look for an acknowledgement. One or both of the timers 54, 57 can be set by the user of the terminal.

As described above, the arrangements shown in FIGS. 4 and 5a to 5c provide workable arrangements for terminating a useful proportion of the calls that might be placed accidentally or improperly terminated by a user. One factor which might affect how successful the systems shown above in FIGS. 4 and 5a to 5c is that of noise, and in particular noise resulting from the terminal being carried in a pocket (where clothes can rub over the microphone and generate rustling noises) or a bag (where the terminal can come into contact with other items being carried).

Figure 6:
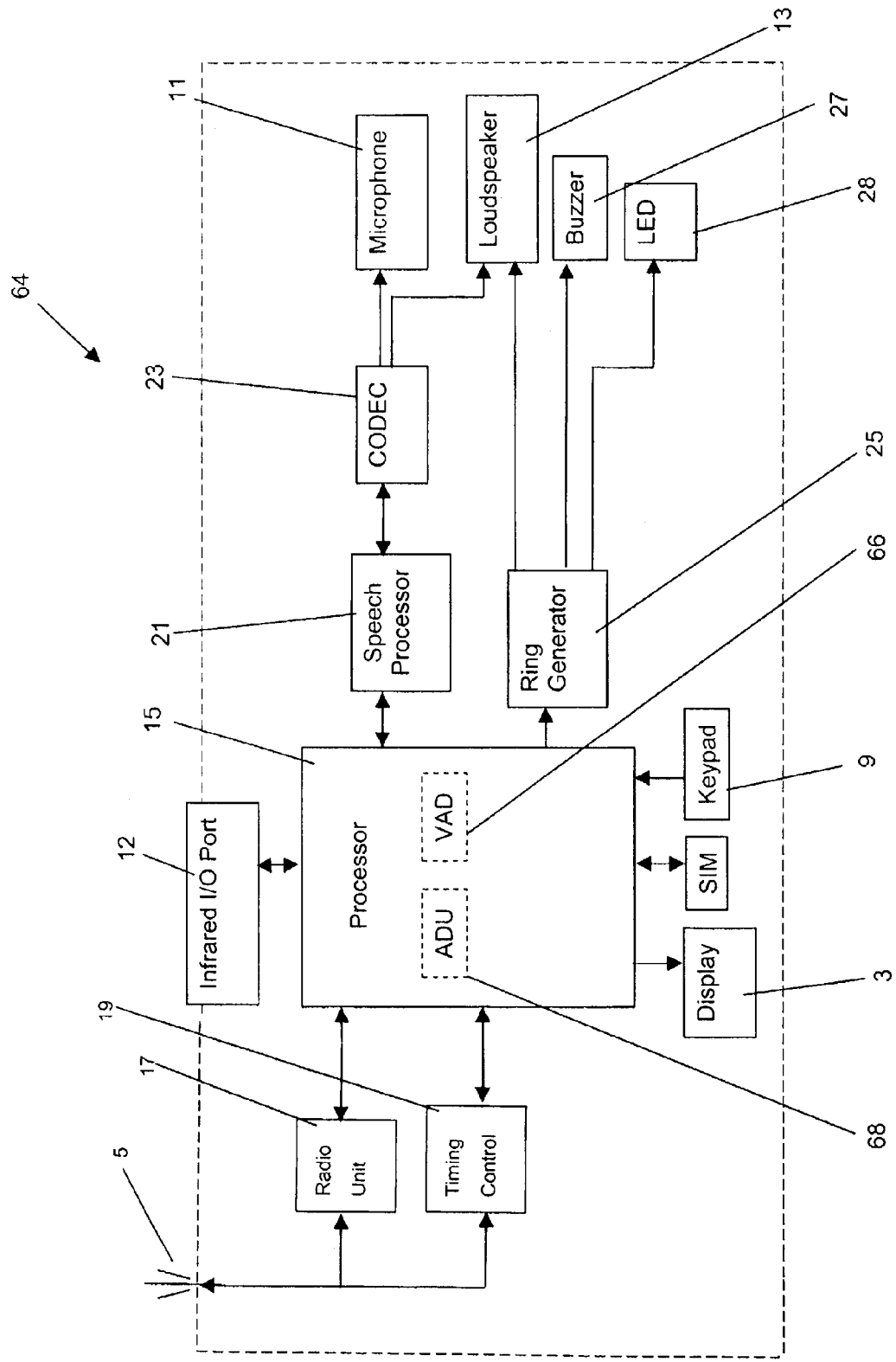
FIG. 6 is a schematic representation of components of a communications terminal in accordance with another embodiment of the invention.

FIG. 6 is a schematic illustration of a mobile terminal 64 in accordance with a currently preferred best mode for implementing the invention, and in particular in accordance with an embodiment of the invention where background noise is less likely to disrupt the automatic termination of an accidental or improperly terminated call. Components of the terminal shown schematically in FIG. 6 that are common to the terminal shown in FIG. 3 are referenced with the same reference numerals as those used in FIG. 3.

The apparatus of FIG. 6 is based on a modification of a conventional mobile telephone of the type which is capable of operating in a so-called discontinuous transmission (DTX) mode.

Discontinuous transmission is used in mobile telecommunications systems to switch the radio transmitter off between speech pauses. The use of DTX saves power in the mobile terminal and thus increases the life of the terminal's battery power supply. DTX also reduces interference levels to improve transmission quality.

Some conventional DTX systems, instead of completely switching the transmission off during speech pauses, generate parameters that characterise the background noise, and send these parameters over the air interface at a low rate in Silence Descriptor (SID) frames. The parameters are used at the receive side to regenerate background noise (referred to in the art as "comfort noise") which reflects, as well as possible, the spectral and temporal content of the background noise at the transmit side. The parameters that characterize the background noise are referred to as comfort noise (CN) parameters. The comfort noise parameters typically include a subset of speech coding parameters: in particular synthesis filter coefficients and gain-parameters. European Patent Application No. 0843301 describes a system for generating comfort noise when a mobile terminal is operating in a discontinuous transmission (DTX) mode.

In a typical implementation of a DTX transmission system a "voice activity detection" (VAD) algorithm is employed to distinguish between "user speech and noise" and "noise without user speech". Further details of VAD algorithms are explained in GSM recommendation: GSM 06.82 "Voice Activity Detection (VAD) for Enhanced Full Rate (EFR) speech channels" (the contents of which are incorporated herein by reference), and are not further discussed here.

The terminal 64 shown in FIG. 6 comprises a processor 15 and a voice activity detection (VAD) module 66 of the type that is currently commonly available in the art. The VAD module 66 may be implemented in hardware either as a discrete component or as part of the speech processor 21, or more preferably—as shown schematically in FIG. 6—may be implemented as a computer program (or algorithm) executed by the processor 15.

The terminal is also provided with an automatic disconnection unit (ADU) 68 that in the preferred embodiment is also implemented as software executable by the processor. Once again, as an alternative to a software solution, the ADU 68 could of course be implemented as hardware either as a discrete component or as part of another component of the terminal 64.

As will now be described in detail with reference to FIGS. 7a, 7b and 8a to 8c, the ADU 68 is operable to modify the normal operation of the terminal to take steps to automatically terminate a call in circumstances where no input, or a lapse in input, to the terminal has been detected.

Figure 7A:
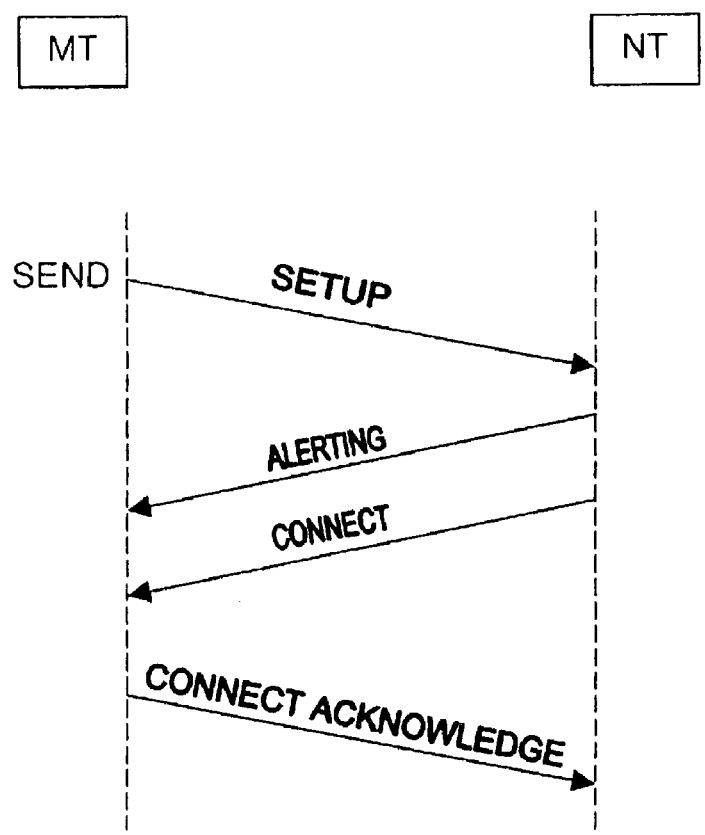
FIGS. 7a and 7b are schematic representations of the GSM (Global System for Mobile Communications) protocols employed to establish a call.

As is well known in the art, GSM telecommunications systems employ a communications protocol that can be approximated by a three layer model, with each layer (known as a Radio Interface Layer) of the model having a particular function or set of functions. The three layers of the model are arranged in a so-called "communications stack" at each end of a given communications channel with the lowermost layer being the physical interface between the communicating devices. The following description will refer particularly to three sublayers of the third layer: CC, RR and MM standing respectively for Call Connection, Radio Resource and Mobility Management FIG. 7a illustrates schematically the signalling passed between a mobile terminal (MT) and a network terminal (NT) when a call is initiated by a user of a conventional mobile terminal by, for example, pressing the "send" key on his terminal.

As shown, when the terminal detects that the "send" key has been pressed (or some other action has been taken to initiate a call), the processor controls the terminal to send a RIL3-CC (Radio Interface Layer 3) SETUP message the network terminal.

On receipt of the SETUP message, the NT takes steps (which are not of relevance to the present invention) to contact the party (the called party) to be connected to the MT (the calling party). When the NT has successfully contacted the called party it sends a RIL3-CC ALERTING message to the mobile station.

The processor of the MT, on receipt of the aforementioned ALERTING message, controls the ring generator and loudspeaker to play a ringing tone to the calling party.

When the NT is ready to connect the called party to the calling party terminal it sends a RIL3-CC CONNECT message to the MT. Receipt of the CONNECT message by the processor of the MT prompts it to take a number of actions. Firstly, the processor turns off the ring tone generation started on receipt of the aforementioned ALERTING message; secondly, the processor answers the NT with an RIL3-CC CONNECT ACKNOWLEDGE message; and thirdly, the processor connects the MT via the radio interface to the called party so that the calling party can communicate with the called party.

Figure 7B:
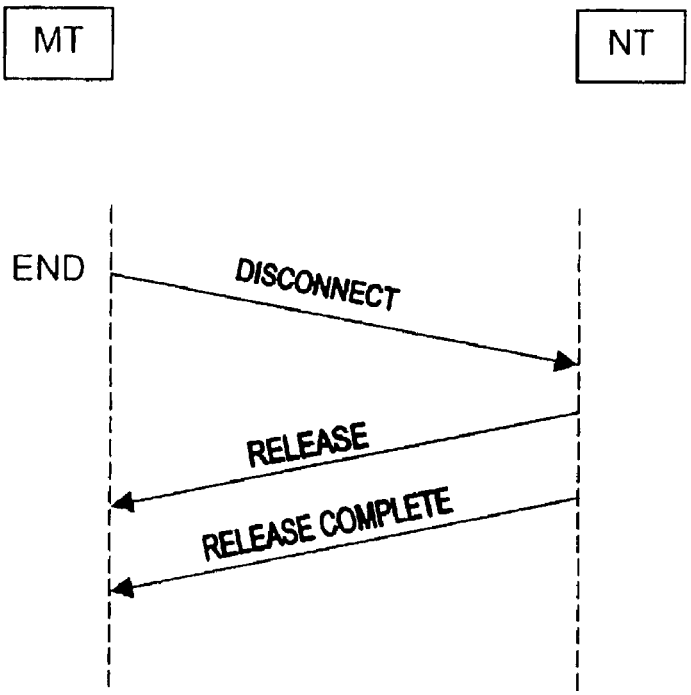

As is shown in FIG. 7b, when the calling party wants to stop communicating with the called party, the calling party (in this example) presses an "end" key on the keypad of their terminal. The processor detects that the "end" key has been pressed and arranges for a RIL3-CC DISCONNECT message to be generated and sent to the NT. The NT then takes steps to terminate the channel between the NT and the called party and answers the MT with a RIL3CC RELEASE message in response to which the MT clears down the protocol stack used in the course of the call. When the NT has finished terminating communications with the called party it sends a RIL3-CC RELEASE complete message which notifies the MT that the channel to the called party has now been released.

Figure 8A:
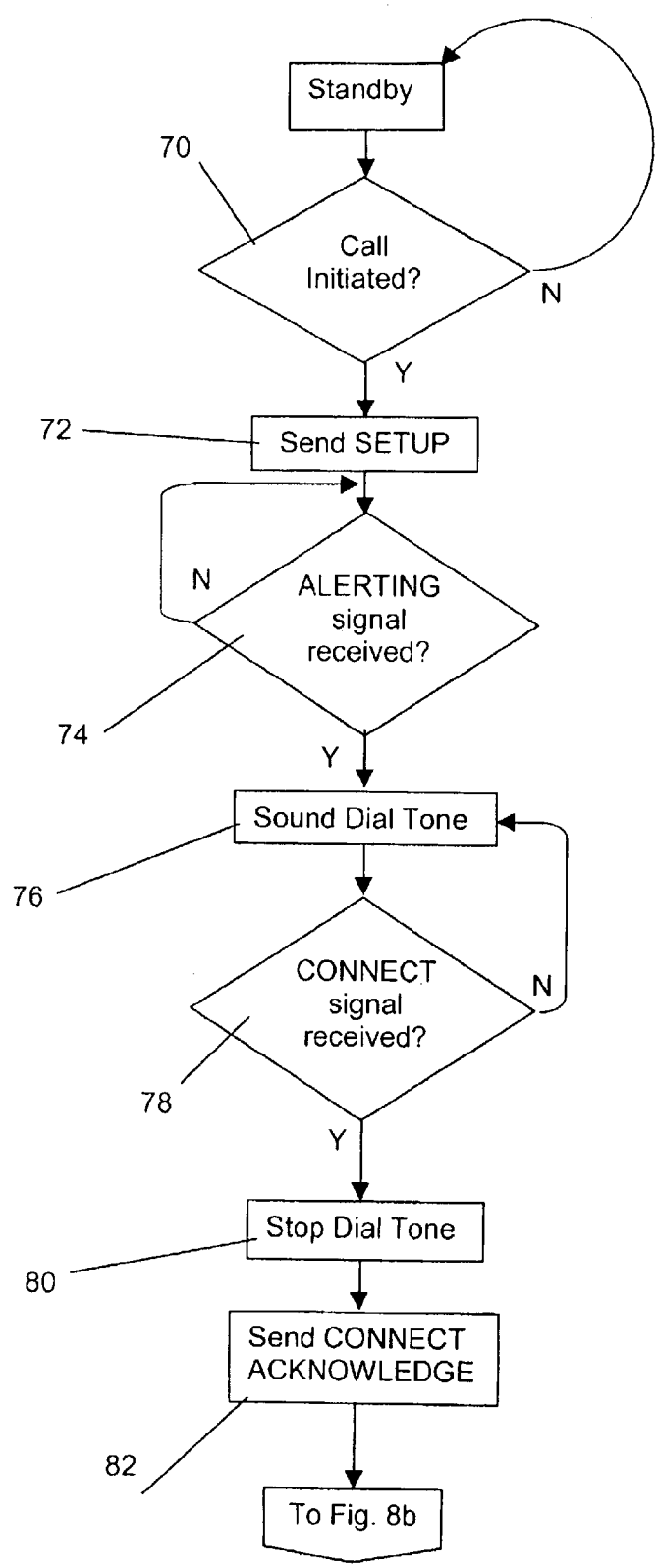
FIGS. 8a to 8c are flow charts illustrating the operating procedure of the terminal of FIG. 6.
Figure 8B:
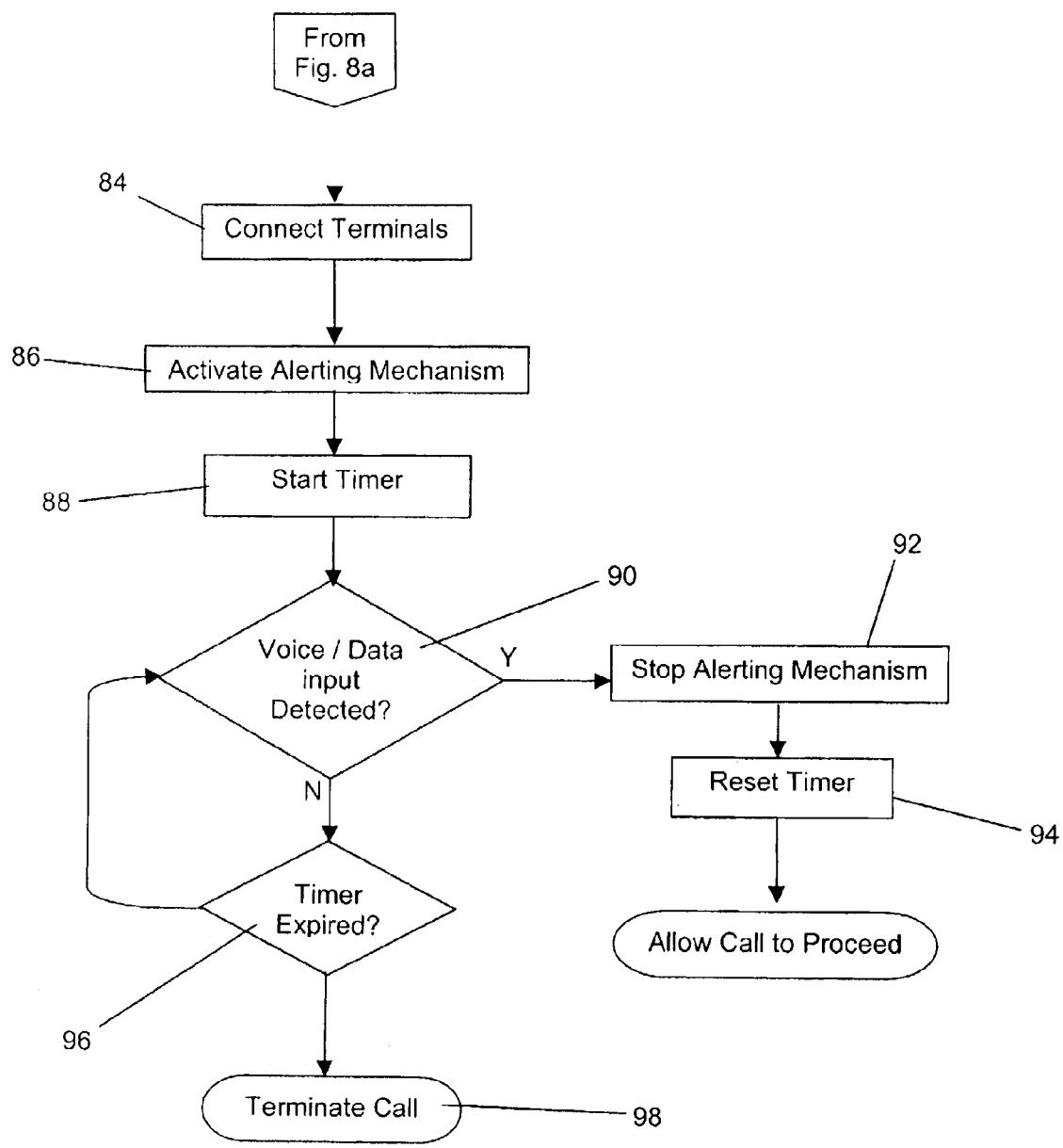
Figure 8C:
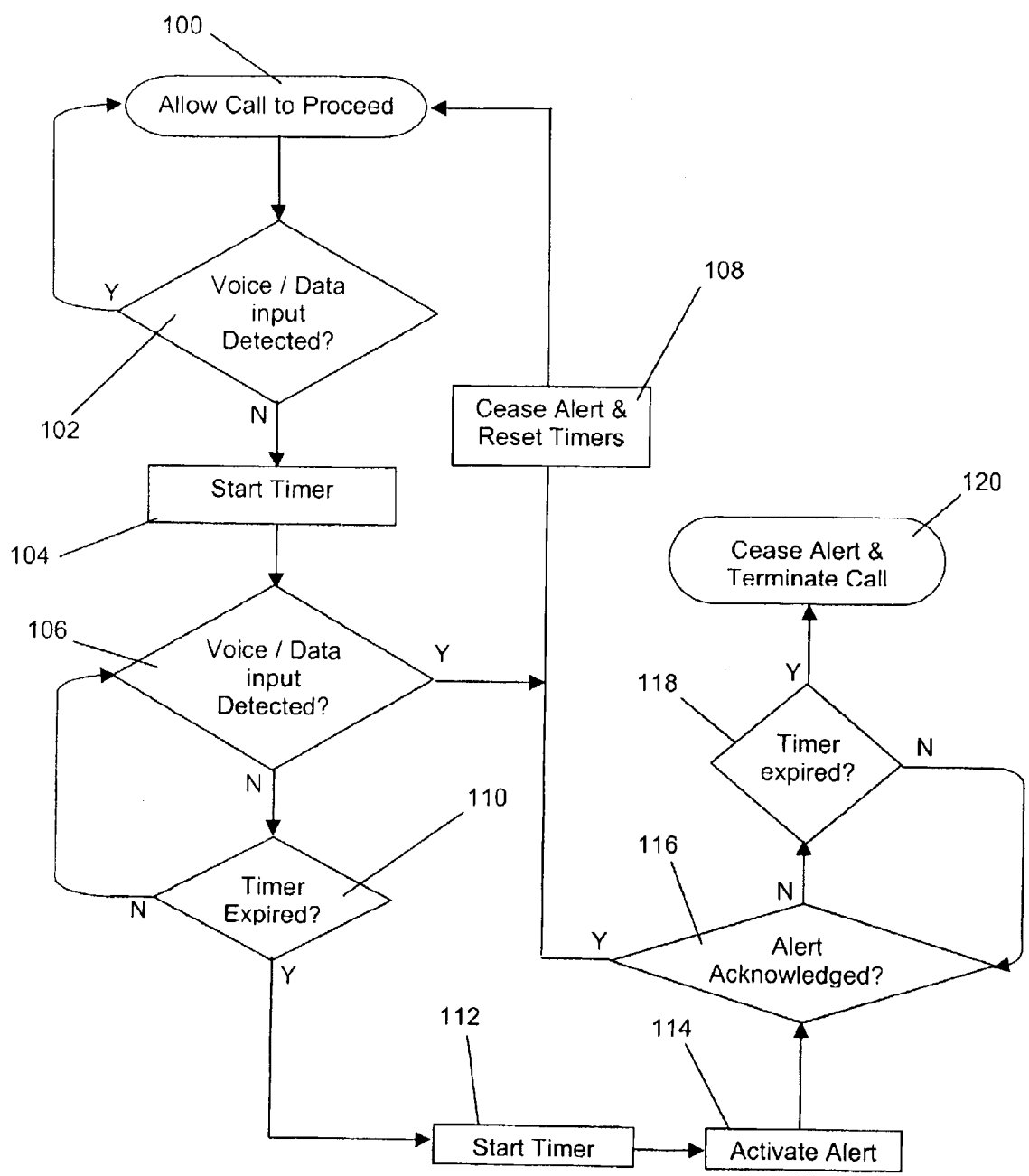

FIGS. 8a to 8c illustrate schematically steps of the communications procedure employed by the terminal of FIG. 6. As is explained below, the procedure implemented by this embodiment of the invention is similar in a number of respects to that normally used in GSM communications (as described above in relation to FIGS. 7a and 7b).

Referring now to FIG. 8a, the processor maintains the terminal 64 in an idle mode until it detects, in step 70, that an attempt to initiate a call has been made by, for example, pressing a send key or selecting an option from a menu.

In response to the detected initiation of a call, the processor controls the terminal in step 72 to send the above described RIL3-CC CONNECT message to a network terminal, and then waits in step 74 for the above described RIL3-CC ALERTING signal from the network terminal.

Once the ALERTING signal has been received, the processor controls the ring generator in step 76 to, in this particular example, play a dial tone to the user by means of the loudspeaker, and then waits in step 78 for the above described CONNECT signal from the network terminal.

It will be appreciated that the ring generator could be controlled to play a ring tone to the user (as happens in the procedure described above with reference to FIGS. 7a and 7b), but it is preferred that the ring generator generates an alert (which could be a visual or other alert) which is different to that normally associated with this stage of a GSM call connection procedure so that a user can immediately tell that they are using a terminal that includes the functionality to be described in relation to FIGS. 8a to 8c, rather than an ordinary terminal of the type described above with reference to FIGS. 7a and 7b.

Once the CONNECT message from the network terminal has been received, the ADU 68 controls the terminal to perform a number of actions: firstly, in step 80, the ADU controls the terminal to stop the alert initiated in step 76; secondly, in step 82 the ADU sends the aforementioned CONNECT ACKNOWLEDGE message to the network terminal; thirdly in step 84 (referring now to FIG. 8b) the ADU 68 connects the MT of the calling party to the called party via the radio interface; fourthly, the ADU controls the ring generator in step 86 to generate an alert, and fifthly, the ADU in step 88 starts an internal timer.

The alert of step 86 preferably comprises activating a buzzer so that a user carrying the terminal in a pocket, for example, is more likely to become aware of the alert when they are in a noisy environment and when they cannot see their terminal's display. Of course, the alert could comprise—additionally or alternatively—activating a ringer and/or illuminating an illumination device such as the LED 28 shown schematically in FIG. 6.

Once the aforementioned steps have been concluded, the ADU 68—in step 90—controls the VAD 66 to detect voice input to the terminal at the microphone, and the processor 15 to detect data input (by any of the means described above in relation to FIG. 5) to the terminal.

If data or voice input is detected, the ADU 68 then controls the processor in step 92 to stop the alert that was initiated in step 86, to reset in step 94 the internal timer that was initiated in step 88, and the call is allowed to proceed.

In no data or voice input is detected, the ADU 68 checks in step 96 whether the timer started in step 88 has expired. If the timer has not expired the ADU 68 continues to check for data or voice input until the timer has expired (i.e. reaches a predetermined value) whereupon the ADU 68 then controls the processor—in step 98—to automatically send the above described RIL3-CC DISCONNECT message to the network terminal to commence automatic termination of the call.

It can be seen from the above, that the adaptation of a conventional mobile terminal to include an ADU having the functionality described above, provides an effective means to reduce the impact of accidental calls from mobile terminals. As mentioned before the ADU preferably comprises software which is executable by the processor, and which resides either in memory (not shown) of the terminal or alternatively as part of the aforementioned SIM Toolkit.

FIG. 8c illustrates the manner in which the ADU of FIG. 6 can be operated to prevent a user from continuing to be charged for a call in circumstances where they had thought they had correctly terminated that call.

As shown in FIG. 8c, it is assumed in Step 100 that a call between the MT terminal of the calling party and a called party is ongoing, and throughout the call the ADU 68 controls the VAD 66 (in step 102) to detect voice input to the terminal at the microphone, and the processor 15 to detect data input (by any of the means described above in relation to FIG. 5) to the terminal.

If input is detected, then the call is allowed to continue to proceed. If, on the other hand, the ADU detects that input has ceased, it controls the processor 15 to start an internal timer in step 104, and then checks again (in step 106) for voice or data input.

If data or voice input is detected, the ADU 68 then controls the processor in step 108 to reset the timer that was started in step 104, and the call is allowed to proceed.

If no data or voice input is detected, the ADU 68 checks in step 110 whether the timer started in step 104 has expired. If the timer has not expired the ADU 68 continues to check for data or voice input (in step 106) until the timer has expired (i.e. reaches a predetermined value) whereupon the ADU 68 starts another timer in step 112. The ADU 68 then controls the processor 15—in step 114—to send a signal to the ring generator 25, and the ring generator generates an alert which is replayed to the user by means of one of the alert devices (such as the loudspeaker, LED, buzzer or vibrator).

The ADU then checks, in step 116, if the alert started in step 114 has been acknowledged by the user. Acknowledgement may be accomplished, for example, by the user pressing a key on the terminal, or sending data to the terminal. If the alert is acknowledged, the ADU (in step 108) ceases the alert initiated in step 114, resets the timers set in steps 104 and 112 and returns processing to step 100 described above. Advantageously, one or both of the timers 104 and 112 can be set by the user.

If the alert set in step 114 is not acknowledged, the ADU 35 checks in step 118 to see if the timer set in step 112 has expired. If the timer has expired the ADU determines that the call has been placed accidentally or not properly terminated, and stops (in step 120) the alert set in step 114 before automatically terminating the call. If the timer has not expired, then the ADU continues to prompt the user with the alert and look for an acknowledgement. In this way, if a user of the MT finishes a call (for example) to a called party and forgets to terminate the call, the terminal of FIG. 6 will—after a suitable delay—automatically take steps to close down the call.

It will be understood, of course, that modifications and alterations may be made to the preferred embodiments described above without departing from the scope of the invention.

For example, whilst the description concentrates primarily on mobile telephones that are compatible with the GSM telecommunications standards, it will be appreciated that the teachings of the invention are equally applicable to non-GSM compliant telephones, or to any other item of telecommunications equipment.

It should also be noted that it is not essential for the embodiment described above in relation to FIGS. 6, 7 and 8 to include a VAD of the type that is currently provided in mobile telephones. Any sort of voice detection software or hardware may be substituted for the particular type of VAD described above without departing from the scope of the invention.

It will also be apparent that it may be possible to modify the process described with reference to FIG. 5 so that the processor detects (instead of or in addition to detecting data flow through the terminal) some physical characteristic(s) of the terminal. For example, the processor could detect the coupling of a data cable to an IO port of the terminal by determining the state of a switch which is made (or broken) when a cable is connected to the terminal, and broken (or made) when the cable is disconnected from the terminal. In such circumstances the processor would always allow calls (which could potentially be accidental calls) to proceed if a data cable is attached. Thus, there is a danger that calls could accidentally be placed when a data cable is attached to the terminal, but as users generally do not do those acts which normally cause accidental calls (such as carrying the terminal in a pocket and accidentally pressing a key) when a data cable is attached it is considered that this potential problem should not pose too much of a drawback in practise, and could provide a relatively inexpensive means to address the problem of accidental calls.

It will also be appreciated that the embodiment of FIG. 3 in particular may utilise any of a number of different voice/sound recognition or sensing systems known to persons skilled in the art without departing from the scope of the invention.

It will also be apparent, and again should be noted, that features of the embodiments described herein are applicable to any of the various embodiments of the invention, and thus that the scope of the invention extends to combinations of features described herein irrespective of whether those particular combinations are explicitly enumerated in the claims.

What is claimed is:

1. A communication terminal, which includes a microprocessor, a microphone and a keypad, for communicating via a communication channel, comprising:
    a comparator for comparing, while said communication channel is open, a microphone output voltage level and a predetermined reference voltage level, wherein the microphone output voltage level corresponds to an audio signal input to said microphone;
    an automatic disconnect unit (ADU) which receives a low volume alert signal from the comparator when the microphone output voltage level falls below the predetermined reference voltage level; and
    first and second timers, wherein:
        if the comparator sends the low volume alert signal for a first predetermined period, the first timer provides a user alert and starts the second timer, and
        if an acknowledgement is not received during a second predetermined period of the second timer, the ADU automatically terminates the communication channel.

2. The communication terminal of claim 1, wherein the user alert is an audio signal.

3. The communication terminal of claim 1, wherein the user alert is a visual signal provided via an LED.

4. The communication terminal of claim 1, further comprising a voice activity detector operable to detect human speech usable for detecting the acknowledgement.

5. The communication terminal of claim 1, wherein the communication terminal is a wireless communication terminal.

6. The communication terminal of claim 1, the communication terminal is a landline communication terminal.

7. The communication terminal of claim 1, wherein the ADU is implemented by software.

8. The communication terminal of claim 1, wherein the predetermined reference voltage level is set to zero when a data cable is connected to the terminal.

9. The communication terminal of claim 1, wherein the predetermined reference voltage level varies for a plurality of preset user-selected modes, including a meeting mode and an outdoor mode.

10. A method for automatically terminating a communication channel of a communication terminal which includes a micro-processor, a microphone and a keypad, for communicating via said communication channel; said method comprising:

comparing, by a comparator, while said communication channel is open, a microphone output voltage level and a predetermined reference voltage level, wherein the microphone output voltage level corresponds to an audio signal input to said microphone;

receiving a low volume alert signal from the comparator when the microphone output voltage level falls below the predetermined reference voltage level; and providing, if the comparator sends the low volume alert signal for a first predetermined period of a first timer, a user alert and starting a second timer; and automatically terminating the communication channel if an acknowledgement is not received during a second predetermined period of the second timer.

* * * * *